Figure 1:
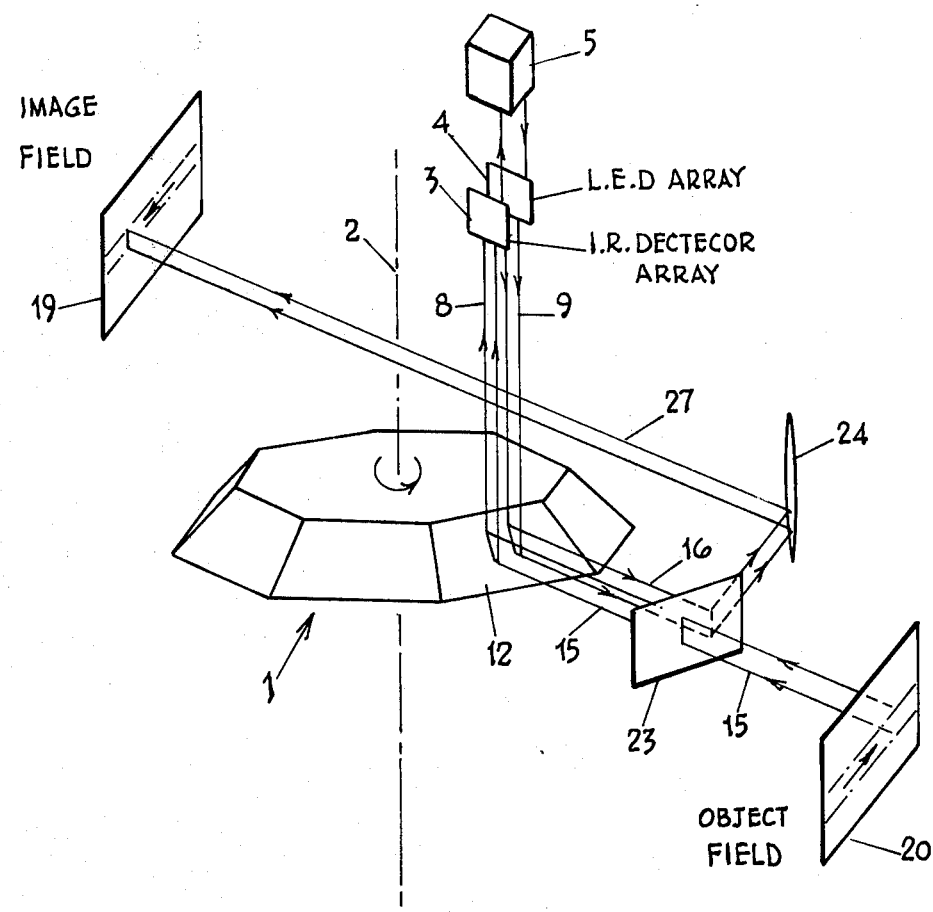

United States Patent [19]

Bridges et al.

[11] 4,323,776
[45] Apr. 6, 1982

[54] INFRARED PARALLEL SCANNING ARRANGEMENT

[75] Inventors: Clive A. Bridges; Patrick J. O'Donnell, both of Berkshire, England

[73] Assignee: The Marconi Company Limited, Chelmsford, England

[21] Appl. No.: 166,802

[22] Filed: Jul. 9, 1980

[30] Foreign Application Priority Data

Jul. 19, 1979 [GB] United Kingdom ............... 25238/79

[51] Int. Cl.³ ............................................. H01J 31/49
[52] U.S. Cl. ..................................... 250/332; 250/334
[58] Field of Search ............... 250/332, 334, 349, 347, 250/348

[56] References Cited

U.S. PATENT DOCUMENTS

| 3,287,559 | 11/1966 | Barnes | 250/334 |
| 3,941,923 | 3/1976 | Wheeler | 250/334 X |
| 3,949,225 | 4/1976 | Aguilera | 250/334 |

FOREIGN PATENT DOCUMENTS

| 2350749 | 2/1977 | France . |
| 2320673 | 4/1977 | France . |
| 1347477 | 2/1974 | United Kingdom . |
| 1434908 | 5/1976 | United Kingdom . |
| 1482641 | 8/1977 | United Kingdom . |
| 2021898 | 12/1979 | United Kingdom . |
| 1569879 | 6/1980 | United Kingdom . |

Primary Examiner—Davis L. Willis
Attorney, Agent, or Firm—Kirschstein, Kirschstein, Ottinger & Cobrin

[57] ABSTRACT

A scanning arrangement for an infra-red imaging device in which a column of I.R. detectors, and similarly a column of L.E.D.'s, scans a field broadside to produce a band of parallel line scans, a number of such band scans being provided to cover the field. Each band scan is performed by a respective mirror facet of a rotating polygonal drum, the facets being tilted at slightly different angles to provide the band displacement. Non-uniformity of the column of I.R. detectors or the L.E.D.'s or the interconnecting channels tends to produce the same pattern of non-uniformity within each band. This is overcome according to the invention by periodically tilting the drum by a random fraction of a band-width so that on successive occasions a particular element of the field is processed by different detector/-L.E.D. channels.

10 Claims, 2 Drawing Figures

INFRARED PARALLEL SCANNING ARRANGEMENT

This invention relates to optical scanning arrangements for image translation devices and particularly, although not exclusively, for such devices for translating infra-red (I.R.) images into visual images. The term 'optical' is thus to be understood in the broad sense of conforming to the laws of light.

Portable versions of such devices, in which the present invention finds application, are required to have minimum weight and size, and therefore power consumption and complexity are reduced as far as possible. In one arrangement a vertical line of, say, sixteen I.R. detectors are effectively swept in a first direction (say horizontally) across the required field of view by a moving mirror. The varying I.R. signal from the optical field, i.e. the scene, generates fluctuating signals in the detectors which in turn are applied, after suitable amplification and filtering, to respective light emitting diodes. The light from these diodes is then focussed and swept by the same moving mirrors (so avoiding any pickoff problems), thus reconstituting the scene but at a visible wavelength. This detector geometry with respect to the scan direction is called parallel scan.

The 16-line band generated by the scan is usually insufficient for a reasonable field of view therefore it is necessary to repeat the process but with the mirror displaced in a second direction transverse to the first (i.e. vertically) so that one band fits neatly on top of another. Typically ten such bands are used generating 160 lines. This system is called parallel banded scan. Where the 16 vertical element detector is extended into a two dimensional array with a series (horizontal) extension the system is called a series/parallel banded scan.

In order to generate a flicker free display the ten bands, i.e. the whole field, have to be generated at least 25 times per second, thus requiring rapidly moving mirrors. The greater the number of bands required the faster the mechanics and resultant power consumption. The alternative, i.e. increasing the number of detectors, leads to an increase in the weight of the electronics and an increase in the power consumption.

In order to achieve an acceptable display free of picture blemishes it is necessary to balance precisely the intensity of each line and band over a wide dynamic range of scene signals and display brightness. However each I.R. detector and each LED element in the array will have different electrical and optical parameters as a result of production, scene signal or environmental factors. Although much can be done to adjust out these variations they cannot be minimised over all conditions satisfactorily and this is a characteristic of such instruments. Similarly the performance of the instrument as a whole is determined by the performance of the worst detector element in the array (as the systems are generally detector noise limited) whereas the average performance of the detectors is considerably higher. Considerable improvements can be achieved in line to line balance by employing some degree of serialisation in the detector array to average out detector/channel electronics/LED properties. However, some or all of the following disadvantages may still be present: more detector elements are required with proportionate volume/weight implications; greater scanning speeds are necessary; band mismatch is unaffected; adjustment between channels is still not eliminated, two scanners may be necessary.

An object of the present invention is therefore to provide an optical scanning arrangement which can overcome the above difficulties in a parallel scanning device such as described above.

According to the present invention, an image translation device comprises an object field and an image field, an array of electro-optical transducer elements, means for scanning the array of elements in parallel in a first direction across the object field repeatedly, means for periodically displacing the scan in a second direction transverse to the first direction by an amount which is at least subjectively random within limits, means responsive to the output of the transducer elements to display a corresponding image in the image field, and means responsive to the amount of the scan displacement to provide correlation between the elements of the object field and the elements of the image field.

The invention can be seen to find application in an imaging system in which the electrical output signals are utilised by other than an LED display, a television type CRT display for example. In such a case, storage and re-timing of the I.R. detector signals in synchronism with the random displacement of the band scans will be necessary.

There may be included a respective array of electro-optical transducer elements for each of the object and image fields, and a mirror assembly common to the two fields for scanning the two fields in synchronism, the means for periodically displacing the scan comprising means for displacing the mirror assembly.

The mirror assembly may comprise a continuously rotatable assembly of mirror facets, each mirror facet effecting a scan in the first direction as the assembly rotates and each mirror facet having an attitude with respect to the axis of rotation of the assembly such as to effect a scan of a respective band of the scanned field, the mirror facets together effecting a scan of the whole field.

The means for displacing the mirror assembly may produce a scan displacement equal to a fraction of the width of a band.

The mirror assembly may be mounted on a shaft about which it is rotatable for effecting successive band scans, the mirror assembly also being mounted for limited rotation about an axis transverse to that of the shaft, the extent of the limited rotation being determined by a cam which is rotatable in random steps and is operated at predetermined points in the continuous rotation of the mirror assembly.

The cam may be rotatable to a plurality of discrete positions each corresponding to a respective number of lines in a band.

It may be operated by a stepping motor having a plurality of output shaft positions and control circuitry including logic circuitry for selecting a random one of the output shaft positions at each operation of the motor. The cam may be operated at the frame interval of the scan.

In an alternative arrangement, the mirror assembly may comprise a continuously rotatable drum of mirror facets at a constant angle with respect to the axis of the drum to provide line scan, and a separate frame mirror pivotable about an axis transverse to that of the drum to provide frame scan, the displacement of the mirror assembly being effected on the frame mirror.

The arrays of electro-optical transducer elements preferably comprise an array of infra-red detectors for scanning the object field and an array of visible light emitting elements for scanning the image field.

Figure 2:
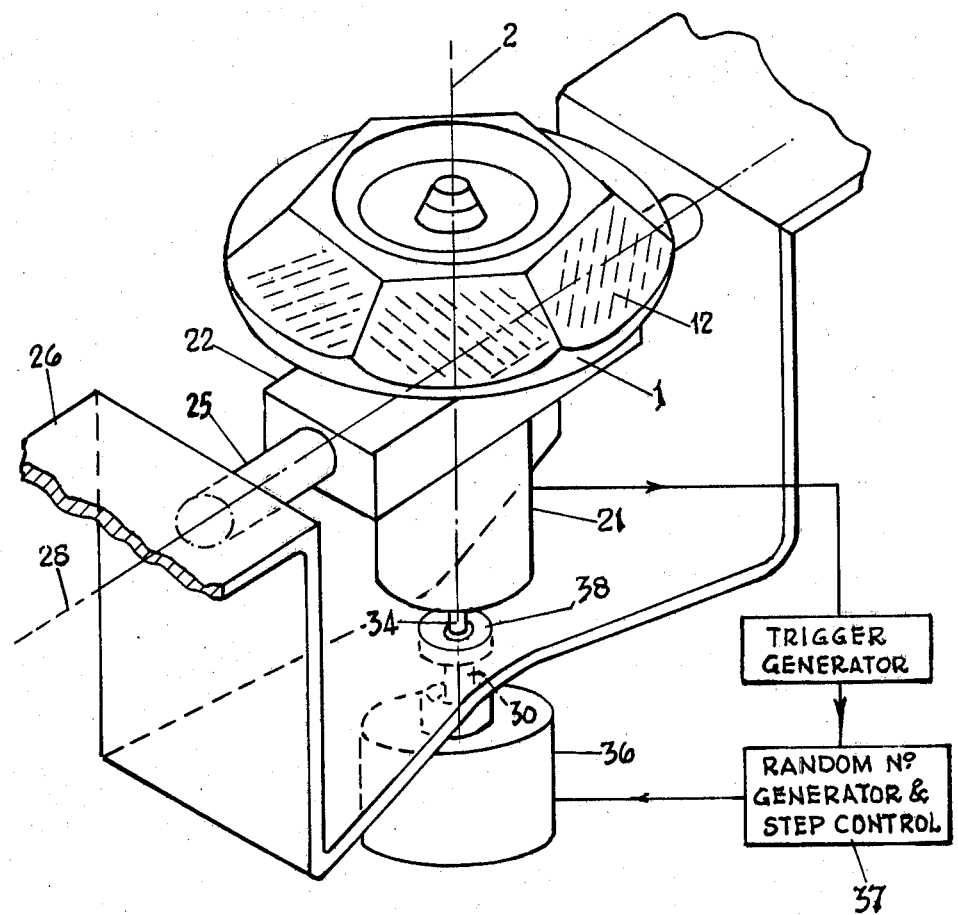

One embodiment of an image translation device incorporating an optical scanning arrangement according to the invention, will now be described, by way of example, with reference to the accompanying drawings, of which FIG. 1 is a diagrammatic perspective view of an image translation device; and FIG. 2 is a perspective view of a scanning mirror arrangement according to the invention.

FIG. 1 shows one particular arrangement in which a mirror polygon 1, rotatable about a vertical axis 2, has eight substantially equal peripheral facets all inclined towards the axis 2 at an angle of approximately 45°, and each having a mirror surface. The polygon is shown with its axis vertical although this is not essential. Vertically above a point on the periphery of the polygon, i.e. axially displaced from this point, is positioned an infra-red detector array 3, of, say, sixteen infra-red detector elements, and a corresponding array of light emitting diodes 4 or comparable electro-optical transducers.

Each infra-red detector element is connected to a respective diode by means of amplifying circuitry 5.

Axial beams 8 and 9 between the arrays 3 and 4 and the facet 12 become transverse beams 15 and 16 before and after (respectively) reflection at the facet 12, which effectively steers these beams to provide a horizontal scan of the image and object fields 19 and 20.

Clearly, as so far described the image field would have to be viewed with the observers back to the object field. This is generally undesirable and so the image field is moved through 180° as shown by a dichroic mirror 23, transparent to infra-red and reflecting to visual light, and a normal mirror 24.

Such a basic arrangement, while it works quite well within limits, is not entirely satisfactory for the reasons mentioned above concerning variations in the overall gain of the sixteen channels from the infra-red detectors 3 to the diodes 4. FIG. 2 illustrates one particular arrangement for overcoming these disadvantages.

Referring to FIG. 2, the mirror drum 1 (having only six facets, but this is of no fundamental significance) is mounted to rotate about its axis 2, driven by a motor 21. The motor 21 is mounted on a cross member 22 having trunnions 25 supported in a frame member 26 of the device on an axis 28. The trunnion mounting incorporates a torsional resilience biasing the mirror assembly in one direction about the axis 28 to avoid backlash.

Periodic displacement of the mirror assembly 1 about the axis 28 is effected by a motor 36 mounted on the frame 26 and having a shaft 30 projecting up towards the motor 21 through a bearing 38. The body of the motor 21 has a shoulder (not shown) on its under face extending across the motor parallel to the axis 28. An offset cam 34 mounted at the top of the shaft 30 engages this shoulder and tilts the mirror drum assembly, including the motor 21 and cross member 22, as it rotates.

The resilient bias in the trunnion bearing also serves to keep the motor body biased against the tilting cam.

The motor 36 is a stepping motor which should have as many steps to a revolution as the required number of displacements of the mirror assembly about the axis 28. Thus if a range of sixteen (i.e. ±eight) line spacings is required then the stepping motor should have sixteen step positions or a multiple of sixteen positions.

The cam drive motor is controlled by logic circuitry 37. At periodic intervals equal to the period of rotation of the mirror assembly, a trigger signal is generated which operates a random number generator to generate a number between zero and sixteen inclusive. This number determines the number of steps to be taken by the cam drive motor 36 and thus the rotational position of the cam 32 and the arbitrary angle of overall tilt of the mirror assembly 5 for its next period of rotation, i.e. for the next field scan.

It may be seen that on average the whole field will be scanned with uniform intensity, thus if in one frame every band scan is displaced upwards by, say, six line widths, in some other frame (probably within one second, if the frame rate is twenty-five per second) every band scan will be displaced downwards similarly.

The eight lines at the top and bottom of the field will only be scanned half as intensely as the remainder of the field but this area is generally of small importance. Alternatively the useful field of view can be defined as having a height reduced by one band-width.

The effect of this random shift may be seen as follows. Each element of the object field will on average be scanned by every I.R. detector.

Since, in the particular embodiment any displacement of the scanning frame on the object field is matched identically by a displacement on the visual field no other account need be taken of the step displacements: scanning of the two fields is inherently synchronised.

In view of the 'sharing' of each field element among the various detectors/L.E.D.'s of each array it will be clear that any variations of performance, in the I.R. detectors, the L.E.D.'s, or the electronics in the channels linking them, will be completely averaged out.

In the above example the averaging process is taken over the whole sixteen channels of the system. While this must give the best average it will generally be sufficient to provide an average of, say, half the maximum i.e. plus or minus four lines. A correspondingly reduced maximum tilt of the assembly is then called for.

In the basic arrangement the scanning lines are sufficiently close that substantially all field elements are normally scanned or 'touched upon'. It is not therefore essential that the random displacements of the present invention are integral numbers of line spacings. In fact, by arranging the tilt angles so that the displacements are non-integral numbers of line spacings, a kind of random interlace is achieved.

In the embodiment of the example described, the periodic displacement of the scan field was performed at frame intervals. It could however, be done less frequently, if the frame rate is high enough to avoid flicker, or more frequently, say after every band scan. The displacement mechanism would then, however, be working at an unnecessarily high rate.

It will be clear that the displacement mechanism may take many other forms and may couple with the mirror assembly at various points other than the lower end of the mirror drive motor.

While it is clear that the invention is most effectively employed where the visual field and object field scans are locked in synchronism by a common scanning mirror arrangement as described, it would be possible to pick off the I.R. detector signals and feed them to a C.R.T. display system suitably triggered to scan in synchronism with the object field scan. Some storage and processing would of course be necessary to cope with the array of sixteen channel signals.

The invention may therefore be seen to lie essentially in the periodic random shift of a scanning system with means, either inherent or added on, for passing on the instantaneous scan position to the corresponding field scan and maintaining them in synchronisation. The random-ness of the periodic shift need not be absolute, the random number generator of the above described embodiment, for example, being a pseudo-random generator producing a long sequence of numbers within which sequence there is no pattern repeat. The degree of random-ness employed must be such that the eye cannot track the movement of a black, i.e. defective, line. Thus, within the limits imposed by the maximum displacements from the basic scan position, the displacement is subjectively random.

While it is generally impracticable to employ a detector array of sufficient extent to cover the field in some circumstances it may be acceptable and in this case the only displacement in the vertical, or second, direction would be the random displacement.

We claim:

1. An image translation device comprising:
   (A) an object field and
   (B) an image field,
   (C) an array of electro-optical transducer elements,
   (D) means for scanning said array of elements in parallel in a first direction across said object field repeatedly,
   (E) means for periodically displacing the scan in a second direction transverse to said first direction by an amount which is at least subjectively random within limits,
   (F) means responsive to the output of said transducer elements to display a corresponding image in said image field, and
   (G) means responsive to the amount of the scan displacement to provide correlation between the elements of the object field and the elements of the image field.

2. An image translation device according to claim 1 including a respective array of electro-optical transducer elements for each of the object and image fields, a mirror assembly common to the two fields for scanning the two fields in synchronism, said means for periodically displacing the scan comprising means for displacing the mirror assembly.

3. An image translation device according to claim 2 wherein said mirror assembly comprises a continuously rotatable assembly of mirror facets, each mirror facet effecting a scan in said first direction as the assembly rotates and each mirror facet having an attitude with respect to the axis of rotation of the assembly such as to effect a scan of a respective band of the scanned field, the mirror facets together effecting a scan of the whole field.

4. An image translation device according to claim 3, wherein said means for displacing the mirror assembly produces a scan displacement equal to a fraction of the width of a said band.

5. An image translation device according to claim 4, wherein said mirror assembly is mounted on a shaft about which it is rotatable for effecting successive band scans, the mirror assembly also being mounted for limited rotation about an axis transverse to that of the shaft, and wherein the extent of said limited rotation is determined by a cam which is rotatable in random steps and is operated at predetermined points in the continuous rotation of the mirror assembly.

6. An image translation device according to claim 5, wherein said cam is rotatable to a plurality of discrete positions each corresponding to a respective number of lines in a band.

7. An image translation device according to claim 6, wherein said cam is operated by a stepping motor having a plurality of output shaft positions and control circuitry including logic circuitry for selecting a random one of said output shaft positions at each operation of the motor.

8. An image translation device according to claim 5, 6 or 7, wherein said cam is operated at the frame interval of the scan.

9. An image translation device according to claim 2, wherein said mirror assembly comprises a continuously rotatable drum of mirror facets at a constant angle with respect to the axis of the drum to provide line scan, and a separate frame mirror pivotable about an axis transverse to that of the drum to provide frame scan, said displacement of the mirror assembly being effected on said frame mirror.

10. An image translation device according to claim 2, 3 or 4, wherein said arrays of electro-optical transducer elements comprise an array of infra-red detectors for scanning said object field and an array of visible light emitting elements for scanning said image field.

* * * * *